United States Patent

[11] 3,617,348

[72] Inventors Dale T. Kelley
Phoenix;
Billy E. Smith, Phoenix; Richard W. Wilson, Scottsdale, all of Ariz.

[21] Appl. No. 866,483
[22] Filed Oct. 15, 1969
[45] Patented Nov. 2, 1971
[73] Assignee Motorola, Inc.
Franklin Park, Ill.

[54] METHOD AND APPARATUS FOR THE EVAPORATION OF CHROMIUM-SILVER
7 Claims, 6 Drawing Figs.

[52] U.S. Cl. .......... 117/71, 117/107, 117/217, 118/49, 263/48, 266/39
[51] Int. Cl. .......... C23c 13/02, C23c 13/12
[50] Field of Search .......... 117/71 R, 107, 107.1; 263/48; 266/39; 118/48, 49, 49.1, 49.5

[56] References Cited

UNITED STATES PATENTS

| | | | |
|---|---|---|---|
| 2,164,332 | 7/1939 | Macksoud | 117/107 UX |
| 2,239,770 | 4/1941 | Becker et al. | 117/107 X |
| 2,799,600 | 7/1957 | Scott | 117/71 (R) X |
| 2,968,583 | 1/1961 | Barth | 117/107.1 X |
| 3,039,896 | 6/1962 | Van Cakenberghe et al. | 117/107 X |
| 3,113,889 | 12/1963 | Cooper et al. | 117/107 X |
| 3,227,431 | 1/1966 | Steeves | 263/48 |
| 3,271,180 | 9/1966 | White | 117/71 (R) X |
| 3,330,647 | 7/1967 | D'A. Hunt | 117/107 X |

*Primary Examiner*—Alfred L. Leavitt
*Assistant Examiner*—J. R. Batten, Jr.
*Attorney*—Mueller, Aichele & Rauner

ABSTRACT: Disclosed is a method and apparatus for the vacuum evaporation of chromium-silver metallization on a silicon substrate by which the chromium adherence is improved and by which very large quantities of silver may be deposited in a short time. The evaporative system described will form a chromium-silver multilayer which adheres tightly to a substrate such as silicon. This system is feasible for the fast large-scale production formation of chromium-silver layers on silicon. The fast evaporative rate of the silver is accomplished by the use of a silver wettable insert in a silver nonwettable crucible.

INVENTOR.
Dale T. Kelley
Billy E. Smith
Richard W. Wilson
BY
Mueller, Aichele & Rauner
ATTY'S INVENTOR.
Dale T. Kelley
Billy E. Smith
Richard W. Wilson
BY
Mueller, Aichele & Rauner
ATTY'S

METHOD AND APPARATUS FOR THE EVAPORATION OF CHROMIUM-SILVER

BACKGROUND OF THE INVENTION

The invention relates to an improved process and apparatus for vacuum coating of the substrate materials, especially semiconductor materials with metals using a high vacuum system.

The metallization system chromium-silver is widely used in the semiconductor industry but is characterized by a certain lack of reproducibility when evaporated onto silicon substrates by conventional evaporation equipment. In this metallization system, a thin layer of chromium is deposited on the substrate, for example, a polished silicon surface, and subsequently a layer of silver is deposited on top of the chromium layer. Chromium is an active metal and good bonding to silicon dioxide and silicon can be obtained providing the materials are clean and free of water and oil. However, silicon surfaces which have been exposed to phosphorus in a diffusion step have a tendency to have water collect upon them quite rapidly. In addition, oils are readily deposited on these silicon surfaces by simply being near oily equipment. For example, the back streaming of pump oils from a typical oil diffusion pump in a vacuum system tends to deposit oil on these silicon substrates. The presence of oil destroys the integrity of the chromium to silicon or silicon dioxide bond thereby resulting in a chromium film which tends to peel from the substrate. Peeling of the chromium layer will also occur on clean surfaces when the chromium layer is too thick since chromium has a coefficient of expansion which differs from that of silicon thereby resulting in a stress which causes the chromium to pull away from the silicon.

Silver has problems also which are peculiar to it alone and in combination with chromium in the chrome-silver system of metallization. Silver does not have a tendency to bond strongly with most materials with the exception of certain freshly evaporated metals such as chrome. SIlver will however, peel form chromium if the chromium becomes oxidized or contaminated during the evaporation process. In the case where very thick layers of silver are evaporated on top of the chromium layer, the peeling problem frequently becomes severe especially where the well known scribe and breaking techniques are used to separate the metallized semiconductor wafers into die.

To evaporate large quantities of metal such as silver from a source, various methods are employed. One of the more common methods is to use a feed mechanism to supply silver to a source as the silver is being evaporated away. This is done by feeding a silver wire or silver pellets or granules onto the hot source during the evaporation period. Another method used is to put a given large quantity of silver in the crucible or container and evaporate the silver from the crucible to completion, the advantage in this latter method being that the reduction in the number of moving parts within the vacuum system minimizes maintenance and equipment reliability problems.

The combination of a wettable crucible containing a large mass of silver or a wettable source having a large quantity of silver leads to a rather messy problem when it is necessary to evaporate silver at a rapid rate in that the silver may blow up the sides of the crucible or source and over the edges and typically evaporates in all directions rather than generally upward as is the desired case. This result leads to a lack of control of the amount of silver deposited unless special monitoring equipment is employed and is obviously more expensive in that additional silver is required to provide the necessary metallization thickness. These costs are extremely high in certain large volume production evaporation facilities such as are commonly found in the larger semiconductor companies. This problem also requires additional cleaning of certain regions of the evaporator which increases production costs. Much additional evaporation equipment may be required.

Evaporating to completion from crucibles which are not wetted by silver are not fully satisfactory in the evaporation of a large silver mass since total evaporation often takes an excessively long time. In crucibles of this type, as the silver melts and evaporates it eventually tends to ball up into a sphere so that the amount of surface in contact with the heated crucible is substantially minimized thereby reducing the flow of heat from the crucible to the silver and resulting in evaporation at a greatly reduced rate. The importance of this phenomenon is probably enhanced due to the high reflectivity of silver so that a substantial part of the radiation heating mechanism is also less effective. The silver balling up on a nonwettable surface is analogous to that of a drop of water on the top of a lightly greased hot griddle in which the water is seen to bounce around the griddle with very little evaporation occurring. As will be shown, the apparatus and method are directed toward the overcoming of the previously discussed shortcomings of the prior art, and applicants' invention, it is believed, has substantially advanced the state of the art with respect to the coating of silicon surfaces with chromium-silver metallization.

SUMMARY OF THE INVENTION

Briefly summarized, the applicants' invention is an evaporation method used in conjunction with a vacuum evaporator having a substructure within the bell jar portion of the evaporator designed to implement the method of the invention wherein silicon wafter may be chromium-silver metallized in high volume at a rapid rate and where faulty metallization due to peeling has been substantially minimized as a result of both the process and the apparatus used in conjunction with it. The silver evaporator has a crucible made of a nonwetting material which contains an insert of a material such as tantalum or molybdenum which is wetted by silver.

BRIEF DESCRIPTION OF THE DRAWINGS

For this application, there are six drawings.

DESCRIPTION OF THE PREFERRED EMBODIMENT

Figure 1:
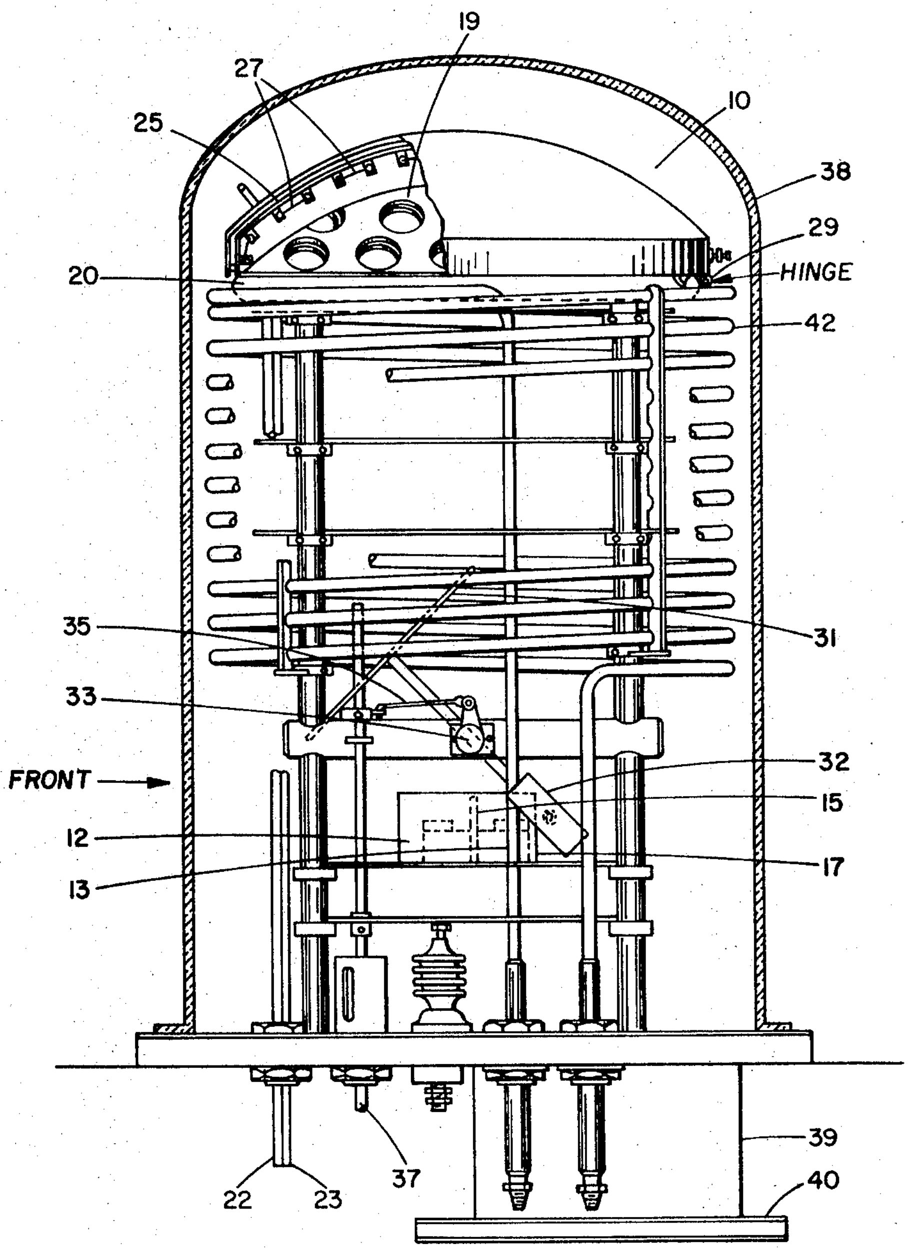
FIG. 1 shows an evaporation structure used in the method of the invention.

The evaporation structure for chromium-silver evaporation process used in accordance with this invention is shown in FIG. 1. The basic structure as shown contains a vacuum evaporation system 10 within a bell jar 38. The structure includes two electrically heated evaporation sources 11 and 12 enlarged in FIG. 3 separated by a shield 15 and enclosed by an evaporation cylinder 17 (FIG. 1) which may be of either quartz or stainless steel. Quartz is the preferred material as it tends to out gas less at the high temperatures encountered near the sources. At the top of the structure is shown the substrate holder 19 in which silicon wafers are placed. In this view, the silicon wafers are not in place in the substrate holder 19. See also the enlarged view of FIG. 2. The substrate holder 19 rests on a cool ring 20. Cool water is passed through pipes 22 and 23 into cool ring 20 to assist in cooling the substrate holder at the end of the evaporation cycle. Covering the substrate holder is a reflective dome 25 which is in combination with the heater filament 27 used to heat the silicon wafers. The dome-heater combination allows an effective vacuum-bake step to be employed in the process as a cleansing means to remove volatile contaminants from the wafers that might reduce adherence. Oil, water and other contaminants are greatly reduced on the surface of the wafers by heating under vacuum as is well known. The dome is hinged at point 29 to facilitate loading and unloading of the substrate holder. A rod, not shown, holds the dome heater up during the time when it is desired to unload or load the evaporator with the substrate holder. Separating the evaporation sources from the substrate during initial parts of the initial evaporation is the flag 31 with counterweight 32, which is used at point 33 and actuated by the linkage 35 and rotary feed-through 37. An additional linkage, not shown, allows the operator of the evaporation system to open the flag 31 by rotating the rotary feed-through 37 from outside the bell jar 38. In view shown, it should be noted that the flag 31 is shown in a partially open condition. Pressure is lowered in the bell jar 38 via the flanged throat 39 connecting the base plate of the vacuum system 10. The flange 40 is bolted onto a typical diffusion pump-type high vacuum system, as is well known.

Figure 2:
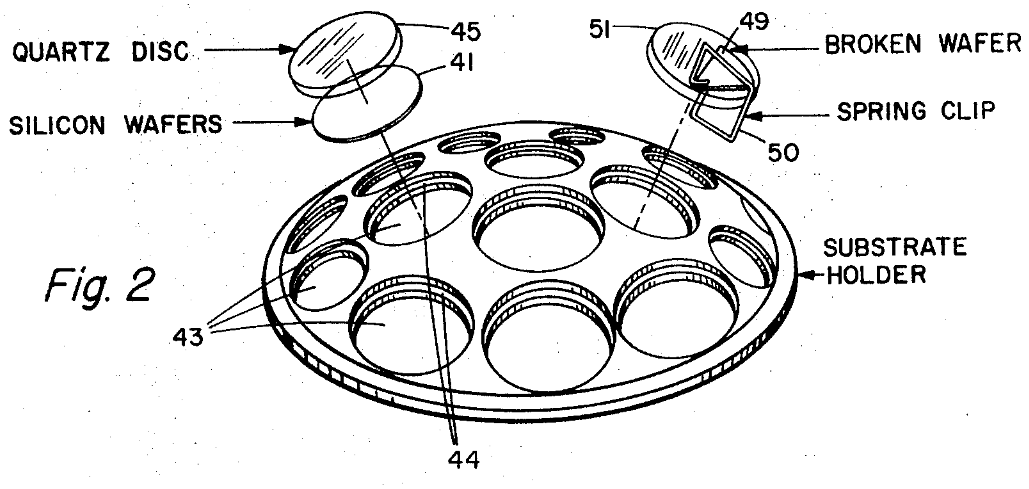
FIG. 2 is a carrier for handling silicon wafers which fit into the structure of FIG. 1.
Figure 3:
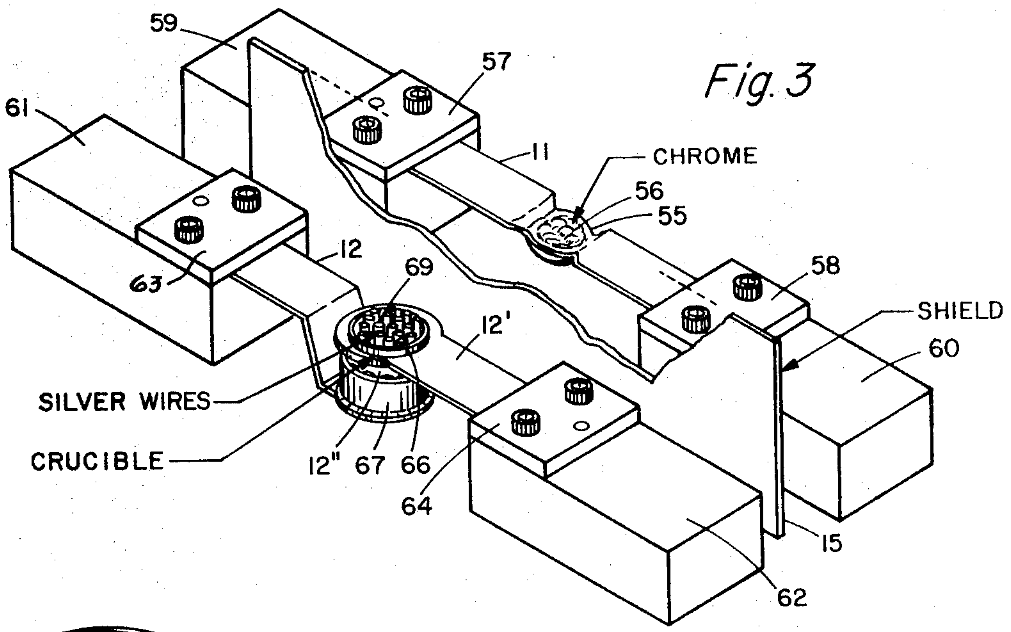
FIG. 3 is another enlarged view of the portion of the structure of FIG. 1 showing an isometric view of the sources used for the chromium-evaporation and subsequently for the sole evaporation in depositing chromium-silver metallization.
Figures 4, 5:
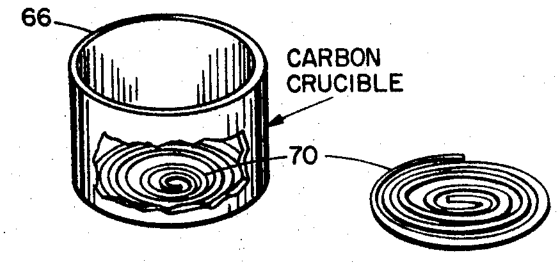
FIG. 4 is a carbon crucible which sets within one of the sources of FIG. 3 and the crucible is shown cutaway to show the placement of a tantalum or molybdenum spiral, also shown in FIG. 5.
FIG. 5 is the spiral.
Figure 6:
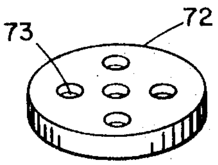
FIG. 6 is a tantalum or molybdenum disc with holes drilled in it.

Silicon wafers 41 to be metallized are loaded into the substrate holder 19, as shown in an enlarged isometric view in FIG. 2. Holes 43 in the substrate holder are provided which have a step 44 upon which a silicon wafer 41 may rest. A quartz disc 45 is then placed on top of the silicon wafer 41. The quartz disc 45 allows the silicon wafer 41 to be radiantly heated by the dome heaters 25 and 27 and also serves to prevent any evaporant from being deposited upon the filaments during the evaporation cycle in case less than full size portion of a silicon wafer is used. For very small pieces of wafer 49, as in the badly broken wafer, as shown in FIG. 2, a spring clip 50 is affixed to the quartz disc 51 and the spring bears against the silicon wafer 49 holding it against the quartz 51 and this, as an assembly, is loaded into the substrate holder 19. A larger view of the two evaporation sources is shown in FIG. 3. The upper evaporation source 11 is of tungsten and has a small cuplike receptacle 55 in which chromium pellets 56 or granules of chromium are placed. The chromium is shown within a cup portion of the source, the source being clamped by two stainless clamps 57 and 58 to two heavy copper electrodes 59 and 60. The source 12 from which silver is evaporated is separated from the chromium source by a tantalum shield 15, although other refractory materials are suitable. This source is clamped in the same manner as the chromium source to two electrodes 61 and 62 by two stainless steel clamps 63 and 64. The source 12 is of tantalum and is adapted to hold a carbon crucible 66. Source 12 consists of two connective portions 12 and 12' fastened together by a heating portion 12'', the heating portion of which is surrounded by a shield 67 to minimize heat losses. Silver wires 69 are shown loaded into the carbon crucible 66. The crucible 66 is shown in an enlargement in FIG. 4. Note that in the bottom of the carbon crucible (shown in the cutaway) is a spiral 70. This spiral 70 of tantalum material speeds up the evaporation of silver from the carbon crucible 66. This spiral 70, shown more clearly in FIG. 5, serves as a wettable region on which the silver will flow and distribute itself, thereby greatly increasing its surface area. Without this tantalum spiral 70, it would take an excessive length of time to evaporate the silver from the carbon crucible even at large filament currents, as the silver tends to form into a small ball near the end of the evaporation and very little heat is conducted or radiated into it due to the minimum amount of contact and surface area. As previously stated, the effect is somewhat like a drop of water on a hot greased skillet and the ball has considerable persistence and less resistance to evaporation unless a wettable surface of this sort is provided in the bottom of the crucible. FIG. 6 shows an alternate wettable source which consists of a tantalum disc 72 of the size to fit into the bottom of the crucible 66. Several holes 73 are provided so that if silver creeps underneath the tantalum disc, the tantalum disc is not caused to fly from the carbon crucible 66 due to the pressures built up by the evaporating silver underneath it. The spiral 70 or disc 72 may be made of molybdenum or another refractory or evaporation resistant metal which can be wetted by silver and from which silver can be evaporated.

Referring once again to FIG. 1, the apparatus is equipped with a coil 42 through which liquid nitrogen is caused to flow during a portion of the cycle while the evaporations are taking place. Liquid nitrogen is introduced into this coil for several reasons. One reason is that the ultimate vacuum or pressure within the bell jar 38 of the system 10 is considerably reduced. The second reason is that oil back streaming from a vacuum pump, water and other substances which might tend to deposit on the silicon wafers prior to and during the evaporation are trapped out on this coil, thereby increasing the adherence of the chromium to the silicon.

In order for chromium to have a maximum adherence to silicon and provide a suitable base for silver metallization, it is necessary that the thickness of the chromium layer be within a certain range. Actual thickness of the chromium layer is difficult to measure accurately with production type equipment. The thickness of the chromium layer is measured by checking the resistance in ohms/square of the chromium layer. Since the resistance of the chromium layer is dependent to a degree on the evaporation system, the resistance figures are arrived at empirically as being measured on a piece of glass at substantially the same distance from the evaporation source as the silicon wafer. It has been determined for the vacuum evaporative system employed that the proper thickness of the chromium layer is obtained when the resistance of the piece of the chromium on the piece of the glass is 12 plus or minus 2 ohms/square. This is of the order of about 1000 angstroms thick. Thicknesses of chromium on the silicon wafer adhere to the silicon well and provide a suitable base for the silver metallization.

The invention will now be described in detail in terms of a method of forming a chromium-silver metallization on the silicon substrate. The metallization system is evacuated down to a pressure in the range of $5 \times 10^{14}$ to $5 \times 10^{16}$ torr. Liquid nitrogen is then passed through the coils to lower the pressure on the system to about $5 \times 10^{17}$ torr or preferably lower. Passing liquid nitrogen through the coil keeps oil and water out of the metallization system and improves the adherence of the chromium to the silicon substrate. The substrate is then heated to a temperature of 300 to 500° C. for 10 minutes in order to clean the substrate while other steps are being performed. Care must be taken during this cleaning step when done under high vacuum at the proper temperature so that the substrate is not oxidized. The silver is heated to a temperature of between 960 to 1050° C. to remove the volatile and gaseous impurities. Silver melts at 960° C. Then the chromium is heated to about 1200° C. to remove its volatile and gaseous impurities. The flag and the evaporative system is opened and the chromium is heated above 1200° C. thereby permitting the chromium vapors to be deposited upon the silicon substrate. The substrate heater at this point has been turned off and the wafers are cooled by passing water through the cooling ring which supports the substrate holder. The evaporation of the chromium is continued until resistance of the chromium on a piece of glass near the substrate has a resistance of 12 plus or minus 2 ohm/square. When the resistance of the chromium has reached this value, the silver is evaporated at a temperature above 1040° C. for a period of about two minutes simultaneously with the chromium to form a silver-chromium intermediate layer. The chromium evaporative source is then turned off and the plating of the silver is continued until a layer of silver having a thickness of about 1.5 to 2.5 microns is obtained. The silver evaporative source is then turned off. Liquid nitrogen is then removed from the coil and the coil warmed by passing regular nitrogen gas therethrough. When the temperature of the evaporative system has approached that of room temperature, nitrogen is then slowly allowed into the evaporative system until atmospheric pressure is obtained.

What is claimed:

1. A method for the vacuum evaporation of a chromium-silver metallization system on a substrate comprising the steps of evacuating a closed system, evaporating chromium to form a layer of chromium on said substrate, and evaporating silver from a nonwetting crucible containing an insert on the bottom thereof made of a silver wettable material taken from the group consisting of tantalum and molybdenum to form a layer of silver on top of said chromium layer.

2. A method for the vacuum evaporation of a chromium-silver metallization system on a substrate comprising the steps of evacuating a closed system to a reduced pressure, passing liquid nitrogen through coils in said closed system to further reduce the pressure and remove contaminants therefrom, heating the substrate to a temperature sufficient to remove impurities from the surface thereof, melting silver at a temperature sufficient to remove the impurities therefrom, heating the chromium to a temperature sufficient to remove the impurities thereof, evaporating chromium to form a layer of chromium on said substrate whereby said chromium layer has a resistance of about 12 plus or minus 2 ohms per square, evaporating silver and chromium simultaneously for a period to form an intermediate silver-chromium layer on said chromium layer, evaporating silver from a crucible made from a nonwetting material and containing an insert on the bottom thereof made of a metal taken from the group consisting of tantalum and molybdenum to form a layer of silver on top of said chromium layer, removing the liquid nitrogen from said coil, and passing gas through said coil to warm said closed system.

3. A method as described in claim 2 whereby said silver evaporation step is continued until a layer of about 1.5 to 2.5 microns thick is obtained.

4. An apparatus adapted for the vacuum evaporation of a chromium-silver metallization system on a substrate comprising a crucible for the silver to be evaporated, said crucible made of a material which is not wetted by silver, and an insert positioned in said crucible made of a material which is wetted by silver.

5. An apparatus as described in claim 4 wherein said insert is made of tantalum.

6. An apparatus as described in claim 4 wherein said insert is made of molybdenum.

7. An apparatus as described in claim 4 wherein said crucible is made of carbon.

* * * * *